United States Patent [19]
Hardy et al.

[11] Patent Number: 6,079,018
[45] Date of Patent: Jun. 20, 2000

[54] SYSTEM AND METHOD FOR GENERATING UNIQUE SECURE VALUES FOR DIGITALLY SIGNING DOCUMENTS

[75] Inventors: Norman Hardy, Portola Valley; Linda L. Vetter, Redwood City; E. Dean Tribble, Los Altos Hills, all of Calif.

[73] Assignee: Agorics, Inc., Los Altos, Calif.

[21] Appl. No.: 08/947,375

[22] Filed: Oct. 8, 1997

[51] Int. Cl.$^7$ .................................................... H04L 9/20
[52] U.S. Cl. .......................... 713/170; 713/176; 713/180; 380/46
[58] Field of Search ................................. 380/30, 23, 46; 713/170, 176, 180, 181

[56] References Cited

U.S. PATENT DOCUMENTS

| | | | |
|---|---|---|---|
| 5,465,299 | 11/1995 | Matsumoto et al. | 380/23 |
| 5,475,763 | 12/1995 | Kaufman et al. | 380/30 |
| 5,673,318 | 9/1997 | Bellare et al. | 380/23 |

OTHER PUBLICATIONS

Horster et al., "Generalized ElGamal signatures for one message block", University of Technology Ghemnitz–Zwickau, Technical Report TR–94–3, May 1994, pp. 1–14.

"Digital Signature Standard (DDS)", Federal Information Processing Standards Publication 186, May 19, 1994, pp. 1–18.

B. Schneier, "Applied Cryptography, Protocols, Algorithms, and Source Code in C", Second Edition, Chapter 20, pp. 483–500, 1996.

*Primary Examiner*—Tod R. Swann
*Assistant Examiner*—Matthew Smithers
*Attorney, Agent, or Firm*—Pennie & Edmonds LLP

[57] ABSTRACT

A document is digitally signed with a digital signature that is unique to the signer/document pair. A document digest is generated by applying a predefined one-way hash function to the document. A pseudo-random key is generated by combining the document digest with at least one other value in accordance with a predefined computational procedure. The digital signature is then generated as a predefined function of the private key, the document digest, and the pseudo-random key k. A distinct pseudo-random key is generated for each distinct specified document, and for a given value of the private key, a distinct digital signature is generated for each distinct specified document. In a preferred embodiment the pseudo-random key generating step includes combining the document digest with a value corresponding to the private key to generate an intermediate value, and hashing the intermediate value with the predefined one-way hash function to generate the pseudo-random key k. In another preferred embodiment the pseudo-random key generating step includes hashing the private key with the predefined one-way hash function to generate a first intermediate value, combining the document digest with a value corresponding to the first intermediate value and an ancillary secret value to generate a second intermediate value, and hashing the second intermediate value with the predefined one-way hash function to generate the pseudo-random key k.

15 Claims, 6 Drawing Sheets

FIG. 1

Prior Art

SYSTEM AND METHOD FOR GENERATING UNIQUE SECURE VALUES FOR DIGITALLY SIGNING DOCUMENTS

The present invention relates generally to systems and methods for digitally signing documents where the digital signature is generated as a function of the document being signed, a private key associated with the person or entity signing the document and a pseudo-random key, and particularly to a system and method for reliably generating a distinct value for the pseudo-random key for each distinct document to be digitally signed and for ensuring that the pseudo-random key is as unguessable as the private key being used to sign the document.

BACKGROUND OF THE INVENTION

Many electronic transactions, such as financial transactions, require security features to ensure that an authorized party securely transmits a communication to an authorized recipient. At a minimum, systems for supporting such transactions require privacy, data integrity, access control, and user nonrepudiation. The present invention is directed at the digital signatures used to provide user non-repudiation. In a nutshell, user nonrepudiation means that a claim by a user that he/she was not responsible for a particular transaction can be refuted by proving that the user digitally signed the transaction document or message. As a result, given a secure digital signature method, users cannot repudiate the transactions they authorize or perform.

For the purposes of this document, the term "document" shall mean any message, file, or other grouping of electronically encoded information that is considered to be a single unit of information for purposes of applying a single digital signature to provide non-repudiation of the document being signed.

The term "digital signature" shall mean an electronically encoded string or label that can be non-reputably proven to have been generated with a particular signer's private key, with respect to a particular document. In other words, without having access to the signer's private key, it must be possible to prove that either (A) a specific document was signed with the signer's private key, or (B) that the specific document was not signed with the signer's private key (i.e., either the document signed is not the specific document, or the signature is not authentic).

The FSTC (Financial Services Technology Consortium) E-Check project (and many other systems) utilize the Digital Signature Standard for "signing" computerized (digital) documents, such as electronic checks (E-Checks). The DSS uses the public Digital Signature Algorithm (DSA) to compute various encryption key components and apply a digital "signature" to each signed document.

Figure 1:
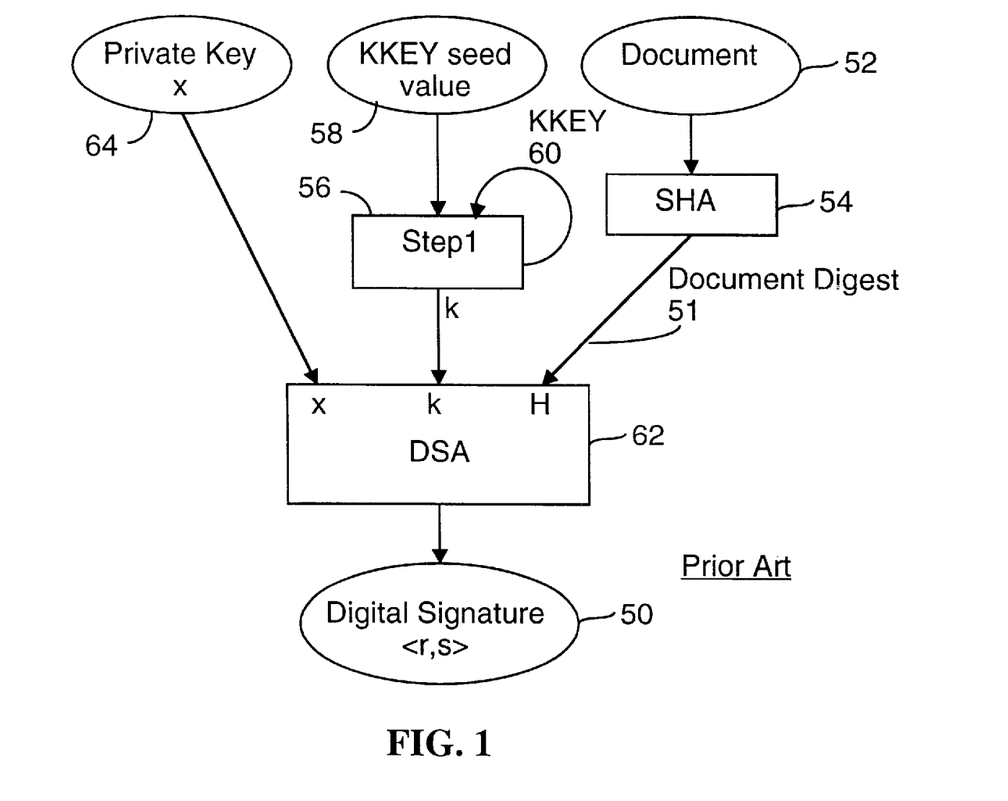
FIG. 1 is a data flow diagram of a prior art digital signature procedure known as the Digital Signature Standard (DSS).

Referring to FIG. 1, a system that generates a digital signature 50 in accordance with the DSA utilizes three sources of inputs and various computational steps to generate a unique, "impossible to repudiate" signature for each document/individual signer pair. More specifically, a "digest" 51 of the document 52 to be signed is generated by applying a one-way hash function 54 known as the Secure Hashing Algorithm (SHA). A pseudo-random key k is generated by a procedure 56 sometimes known as the Step 1 procedure (also called the "Algorithm for Precomputing One or More k and r Values" in FIPS PUB 186, which is the official document describing DSS). The Step 1 procedure generates the key k as a function of a remembered internal state value 60 called KKEY, which is initially set to a seed value 58 when the Step 1 procedure is initialized. The KKEY value 60 is an internal state value of the Step 1 procedure that is generated each time a new pseudo-random key value k is generated. The digital signature 50 is generated by a predefined signature generation procedure 62 known as the Digital Signature Algorithm (DSA), as a function of the signer's private key x (64), the pseudo-random key k, and the digest 51 of the document produced by the SHA 54. Each DSS digital signature 50 generated by the sequence of procedures shown in FIG. 1 is of the form $<r,s>$:

$$<r,s> = <(g^k \bmod p) \bmod q, (k^{-1}(H+xr)) \bmod q> \quad \text{(Eq. 1)}$$

where k is the pseudo-random key, x is the signer's private key, H is the digest of the document being signed, p is a prime number larger than $2^{511}$, q is a prime divisor of p−1 where $2^{159} < q < 2^{160}$ (i.e., (p−1)/q is equal to an integer), and g is an integer equal to $h^{(p-1)/q} \bmod p$, where h is any integer between 1 and p−1 (i.e., 1<h<p−1) such that $h^{(p-1)/q} \bmod p > 1$. p and q are sometimes called family parameters. The integers p, q and g can be public and can be common to a group of users.

In DSS, the signer's public key, y, is related to the signers private key by $y = g^x \bmod p$.

In systems complying with the DSS, the pseudo-random key k, the document digest H and the signer's private key x are all 160 bit values. The KKEY value and its seed value are both 160 to 512 bit values, depending on the implementation. The original document can be any size, of course. The signer's private key x, by definition, must be highly unguessable, and the KKEY seed value must also be highly unguessable.

The term "a highly unguessable value" is defined to mean a value which is effectively unguessable, except by the brute force method of trying all possible values. In order for a value to be highly unguessable it must be (A) sufficiently random that there is no effective way to re-compute its value or the set of all possible values, or (B) "personalized," based on information or personal choices not known to anyone else. Also, for a value to be highly unguessable it must be securely stored or maintained so that it cannot be easily copied or stolen, and it must have a sufficiently long bit length that brute force attacks on the value are impractical. In other words, a 16 bit value cannot be considered to be unguessable, no matter how random, because it would take so few computations to try every possible value. Given continued exponential growth in computer power, the 160 bit length key values used in DSS are becoming less and less unguessable every year. The present invention assumes that the number of bits used in the DSS key values will be adjusted from time to time to preserve the unguessability of those values.

The uniqueness of each DSS signature guarantees both 1) the specific version and content of the document 52 that was signed, and 2) the identity of the individual who "signed" it. This is also done in such a way that any receiver of the signed document (if in possession of the "signer's Public Key") can verify both facts.

The strength of this "guarantee" relies on a couple of factors. First, the two key values (i.e., the private key x and the pseudo-random key k) used by the DSA to compute the signature must be kept highly secret. Second, the two key values must be difficult to determine (highly "unguessable") and unlikely to be common between any two users or documents (strong randomness or pseudo-randomness). Since the private key x is generally assumed to be different for each signer, care must be taken to ensure that the pseudo-random key k is different for every document signed by the same signer. Additional factors are the strength of both the DSA algorithm itself and also of another algorithm, SHA (Secure Hashing Algorithm), which is used to compute the document digest, which is a virtually unique "hash" total for the document being signed. The SHA algorithm is a public algorithm, as is DSA, so the strength of these algorithms does not rely on secrets in the computational aspects or algorithms themselves.

SHA uses no secret keys and, in fact, there is nothing "secret" about the answer it will compute. An important feature of SHA is that, given the same input document or character string to hash, it will always give the exact same answer, regardless of computer language or platform. Therefore, if two people want to ensure that they are both looking at the identical document which has an associated SHA hash total with it, they can compute the SHA hash total on their copy and ensure that it matches the expected result. Another important feature of SHA is that any change to the input document, including a single bit manipulation, will result in a different SHA hash result, indicating an altered document. This is a particularly important feature in using SHA to help ensure that E-Checks and other financially-based documents have not been tampered with or altered along the way.

The inclusion of the SHA hash result for a given document in the subsequent computation of the DSS digital signature therefore ensures that the signed document has not been altered in any way from what the originator (signer) generated. This addresses the first of the two guarantees: that the document received exactly matches the version and content of the document signed and sent.

The second of the guarantees, that the document has, in fact, been signed by the appropriate individual, is ensured by the inclusion of that individual's "Private Key" as another of the inputs to the DSA computation of the final signature. This Private Key (referred to as "x" in the Figures and elsewhere in this document), must be carefully chosen and protected. Keeping it "secret" is the primary protection over misuse.

In DSA, the individual's Private Key ("x"), the document's SHA-generated digest (sometimes denoted as "H" or "DocSHA"), and a pseudo-random key ("k"), are all used by the digital signature procedure to compute a completely unique digital signature each time. Since the algorithms used by the digital signal procedure are public, and the SHA hash value can be re-computed by anyone with access to the document, the additional application of the secret pseudo-random key "k" is critical to ensure the protection of the value of the individual's Private Key "x".

Pseudo-Random Key "k" Must be a One Time Key

It is a well known fact that any exposure of the value of the pseudo-random key "k" allows an attacker to easily determine an individual's Private Key, and thus use it to forge their signature. The reuse of the same value for "k" to sign more than one document leads to such an exposure. In fact, there is a closed form procedure for computing a person's private key given two distinct documents signed by that person that were signed using the same the pseudo-random key "k". That procedure is shown in Table 1.

There are several computer system actions which could reset the state of the pseudo-random number generator used in the Digital Signature Algorithm (DSA) to a previous value. Some of these are as simple as restoring a system backup, others are completely transparent to system users. Thus, it is essential to produce an algorithm that does not have this vulnerability. The present invention provides a new technique for generating a unique per-signature value for "k" that entirely avoids the danger of signing different documents using the same "k" secret value.

Protecting the value of the individual's Private Key "x" is predicated on not only the "randomness" but also the "one-time" nature of the "unique" pseudo-random key "k". Each "k" should be produced for exactly and only one iteration of a signature generation. Restated, the pseudo-random key "k" must be a one-time key that is not duplicated for subsequent signature computations. If a given key "k" were used in two or more signatures for the same user (using the same private key "x"), for two or more documents, then someone with access to those documents would be able to determine the value of their private key "X", and, subsequently would be able to "forge" the true owner's signature on any future document.

As stated in the industry-leading work on encryption, Schneier's Applied Cryptography (see page 492) in discussing attacks against "k" in DSA:

Each signature requires a new value of "k", and that value must be chosen randomly. If Eve ever recovers a "k" that Alice used to sign a message, perhaps by exploiting some properties of the random-number generator that generated "k", she can recover Alice's private key, "x". If Eve ever gets two messages signed using the same "k", even if she doesn't know what it is, she can recover "x". And with "x", Eve can generate undetectable forgeries of Alice's signature. In any implementation of the DSA, a good random-number generator is essential to the system's security.

The procedure for detecting when two non-identical documents have been digitally signed used the same pseudo-random key, and for then computing the secret key x used to sign both documents is shown in Table 1.

TABLE 1

Procedure For Detecting Reuse of Pseudo-Random Key k
And Then Determining User's Private Key x Procedure for Detecting Reuse of Pseudo-Random Key k:
  /* Given n digital signatures, this procedure takes
    approximately nlog(n) computational steps to locate
    two digital signatures generated using the
    same pseudo-random key k." */
  Sort the digital signatures <r,s> of all documents signed by the
    same user, sorting on the first field "r".
  As each new signature is inserted into the list of sorted signatures,
    check to see if it's "r" field is identical in
    value to a neighboring entry. If so:
    {
    /* The two identified digital signatures were
      generated using the same pseudo-random key k,
    Perform the Procedure for Computing the User's Private Key
    }
Procedure for Computing the User's Private Key:
  /* The inputs to the procedure are"
    • Two digital signatures <r1,s1> and <r2,s2> where r1=r2.
    • The document digest values H1 and H2 for the two
      documents signed by the two digital signatures. H1 must
      not be equal to H2.
    • Family parameter q
*/
1) Compute:
    $C = s1(s2^{-1}) = (k^{-1}(H1+xr) \bmod q)((k^{-1}(H2+xr)) \bmod q)^{-1}$
    $= ((H1+xr)((H2+xr)^{-1} \bmod q)) \bmod q$
  Compute C as a numeric value directly from the
  numeric values of s1 and s2.
2) Solve the above equation for x (i.e., the signer's private key):
    $x = ((H1 - CH2) / (r(C-1))) \bmod q$
3) Compute x directly from the above equation. This computation
  fails when H1 = H2, because then s1=s2 and C=1.

As shown by the two procedures described in Table 1, if a pseudo-random number k is re-used by the same signer, it is fairly easy for an attacker to identify the two documents that were signed using the same k value is relatively easy, and after two such documents have been identified the attacker has a much simpler problem to solve to determine the value of "x". This is because the value of "k" becomes a "constant" in such computational attacks against the pair of signature values, rather than the significantly harder problem of solving for the unknown values of both "x" and "k" in each signature value.

It should be noted that there is no real exposure in the same key "k" being used by the same individual to sign the same document, as the resulting digital signature would therefore be the same as that already previously produced and thus "known". Similarly, using the same key pseudo-random key "k" to sign the same (or different) documents by two different users (having two different private keys) also does not cause significant exposure because the value of "k" is still not known (unless the "attacker" knows the value of one of the "x's" and can use that factor to help determine the other person's "x" value).

Most implementations of DSS systems actually have a number of levels of "secret" numbers which are used to create pseudo-random numbers to be used on each iteration of the digital signature process. Since organizations may want some overall control factors besides the individual keys, there are provisions for "families" of keys (e.g., family parameters "p" and "q"), as well as multiple individual pairs of "x" and KKEY seed values (typically, one pair per user). The present invention focuses on preventing duplicate signature values for the same individual signing two different documents, so we will not further concern ourselves with these other aspects (e.g., family parameters), which have no direct bearing on this issue.

There is an additional concern where there may be multiple DSS systems supporting signatures for the same user (i.e., using the same "x" and same starting KKEY seed values). This could occur, for example, if multiple Smart Cards are made for the same user keys. This is a major exposure to the keys as well, but is not being directly addressed in this document. However, the pseudo-random key generation techniques of the present invention may eliminate or reduce the key exposure problem presented by multiple Smart Cards for the same user key.

Risk of Duplicate Pseudo-Random Keys

The potential risks of reusing or having a duplicate "k" value (the pseudo-random key) used in multiple signature operations that are addressed in this document are based on a couple of factors in existing DSS implementations. DSS defines the specific "Step 1" process that must be used. The Step 1 procedure is called the "Algorithm for Precomputing One or More k and r Values" in FIPS PUB 186, which is the official document describing DSS. The Step 1 procedure takes an unguessable number value (the 160–512 bit "KKEY" seed) and converts it to a unique pseudo-random 160-bit key "k" on each iteration of the algorithm. More precisely, after presetting the Step 1 procedure's internal state value to a KKEY seed value, the Step 1 procedure generates a new k value and a new internal KKEY state value for each iteration of the Step 1 procedure. In FIPS PUB 186 document, both the seed value and the internal state value are called KKEY. We will address two areas of potential risk here.

First, the way the same initial KKEY value can be used to seed the Step 1's process and produce a different 160-bit result each time is that Step 1 additionally uses the KKEY value from its previous iteration (e.g., "retained state" information, labeled "KKEY" in the figures) as part of each next iteration. As long as this "retained state" information remains intact, the subsequent "k" keys will each be generated "one-time", although the original KKEY seed value has never changed.

Secondly, while changing the KKEY seed value periodically can also help ensure new "k" values, the selection of the KKEY seed value is important. The "robustness" of the selection of the KKEY seed values (i.e., each KKEY seed value should be either truly random or highly "unguessable" and distinct from all previously used KKEY seed values), have an impact on the uniqueness of the subsequently computed values of "k".

We will first address the issue of the Step 1 algorithm's dependence on retained state information.

Resetting State

There are a number of useful mechanisms in today's computer systems designed to provide transparent or relatively unintrusive system recovery capabilities. Some of these are "visible" to the system user, as they can be manually initiated, such as re-booting the system or restoring a system from a previous backup. Others may display warning messages or become known by some other means (e.g., via system documentation or other associated noticeable behavior). However, there are many other mechanisms that are hard to detect or predict. These include a wide range of hardware failure detection/retry mechanisms. Some of these involve retrying sequences of instructions or even restoring memory locations to previous values. Similarly, a simple power failure could cause some systems to lose (and then reset) state. The KKEY internal state value used in Step 1 is mutable and may or may not be volatile depending on the combination of hardware platform, operating system, and DSS implementation.

Regardless of the initial cause (external or internal, known or not), the result of restoring the "State" of DSA's Step 1 algorithm to any prior value and then using it to sign new documents could lead to the reuse of a previously used "k" value. Since many systems are "dedicated" to one user (e.g., a personal computer) or at least constrained as to how many users of the system digitally sign documents (e.g., a server for a company's accounting department), the chance that any reuse of a given "k" value will be for the same user (same "x" value) is significant.

It should further be noted that how far back the Step 1 State is set (e.g., how many documents were signed between the time of the first occurrence of that State and the subsequent reset back to that State) will affect the risk of exposure. Resetting the Step 1 State is particularly dangerous where the documents being signed have any obvious (readily visible) sequencing to them, such as in the case of a series of Electronic Checking (E-Check) check numbers. Attacks on the system become easier where there are a series of duplicate "k" key-signed pairs of documents. For example, if 10 documents, checks #101–110, were signed and Step 1's State returned to where it was on signing check #101, and 10 subsequent checks were then signed, there would be 10 pairs (101:11 1, 102:112, through 110:120) of results to use in attacks.

Strength of Unguessable Number Source

The seeding of "KKEY", the "unguessable" number source used by Step 1 to compute a one-time use pseudo-random key "k", also must be carefully addressed. Having these created and set via user entry mechanisms is obviously dependent on the capabilities of the users. Having them created or re-created "automatically" must ensure proper attention is paid to a number of system (hardware, operating system, programming language, etc.) factors. For example, one error commonly reported in the literature is depending on some aspect of the machine clock. In virtual machines the "virtual" clock may not run between keystrokes.

Code that reliably creates random or pseudo-random numbers in one system may fail to do so when ported or hosted on a different platform. Such a failure could well be "silent", leading to the user's private key being compromised. Similarly, burying "obscure" code in an application to produce random, unguessable, or pseudo-random numbers is also not advisable or reliable.

Combined Problem

These risks are further compounded due to the combination of the above two factors. Some "loss of state" conditions could be detectable by the system, and the system then designed to require a new KKEY seed value before continuing. Dynamically recreating a new KKEY seed value is dependent, however, on having a reliable way to then automatically (or otherwise) create a new KKEY unguessable number seed in any environment in which that code may be operating.

The alternative of "suspending" the signing capability until an outside source provides a new, robust KKEY seed value also exists. This is quite probably an acceptable situation in wholly self-contained DSS implementations, such as replaceable hardware devices (e.g., dedicated co-processor) or external Smart Cards. These systems are also the only ones likely to have the capabilities to detect all relevant losses of state or KKEY values.

The other concern here, however, is that most software-based systems are not fully capable of detecting all losses of state (e.g., in a system restore situation or transparent restart, etc.). Thus, the system does not always reliably know when it is in need of a new KKEY seed value.

Suitably designed self-contained systems such as hardware-based processors and Smart Cards may be capable of avoiding the Step 1 State resetting problem and the KKEY seed value generation problem discussed above. However, there are many reasons (most of them based on economics and administrative convenience) for needing reliable digital signature capabilities in portable, software-based implementations.

It is an object of the present invention to provide a technique for creating a pseudo-random key "k", for use in a digital signature procedure such as DSA, that is reliably distinct for every different document signed using the digital signature procedure.

It is another object of the present invention to provide a technique for reliably generating a highly unguessable pseudo-random KKEY seed value for use in a digital signature procedure such as DSA.

SUMMARY OF THE INVENTION

A document is digitally signed with a digital signature that is unique to the signer/document pair. The digital signature is generated as a predefined function of the signer's private key, a pseudo-random key, and the document. A document digest is generated by applying a predefined one-way hash function to the document. The pseudo-random key is generated by combining the document digest with at least one other value (which must be secret or unguessable) in accordance with a predefined computational procedure. The digital signature is then generated as a predefined function of the private key, the document digest, and the pseudo-random key k. A distinct pseudo-random key is generated for each distinct specified document, and for a given value of the private key, a distinct digital signature is generated for each distinct specified document.

In a preferred embodiment the pseudo-random key generating step includes combining the document digest with a value corresponding to the private key to generate an intermediate value, and hashing the intermediate value with the predefined one-way hash function to generate the pseudo-random key k.

In another preferred embodiment the pseudo-random key generating step includes hashing the private key with the predefined one-way hash function to generate a first intermediate value, combining the document digest with a value corresponding to the first intermediate value and an ancillary secret value to generate a second intermediate value, and hashing the second intermediate value with the predefined one-way hash function to generate the pseudo-random key k.

In yet another preferred embodiment the pseudo-random key generating step includes hashing the private key with the predefined one-way hash function to generate a first intermediate value; combining the document digest with a value corresponding to the first intermediate value and an ancillary secret value to generate a second intermediate value; hashing the second intermediate value with the predefined one-way hash function to generate a seed key value; and performing a predefined pseudo-random key generation procedure, using the generated seed key value as an input thereto, to generate the pseudo-random key k.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENTS

Computer System Implementation

Figure 2:
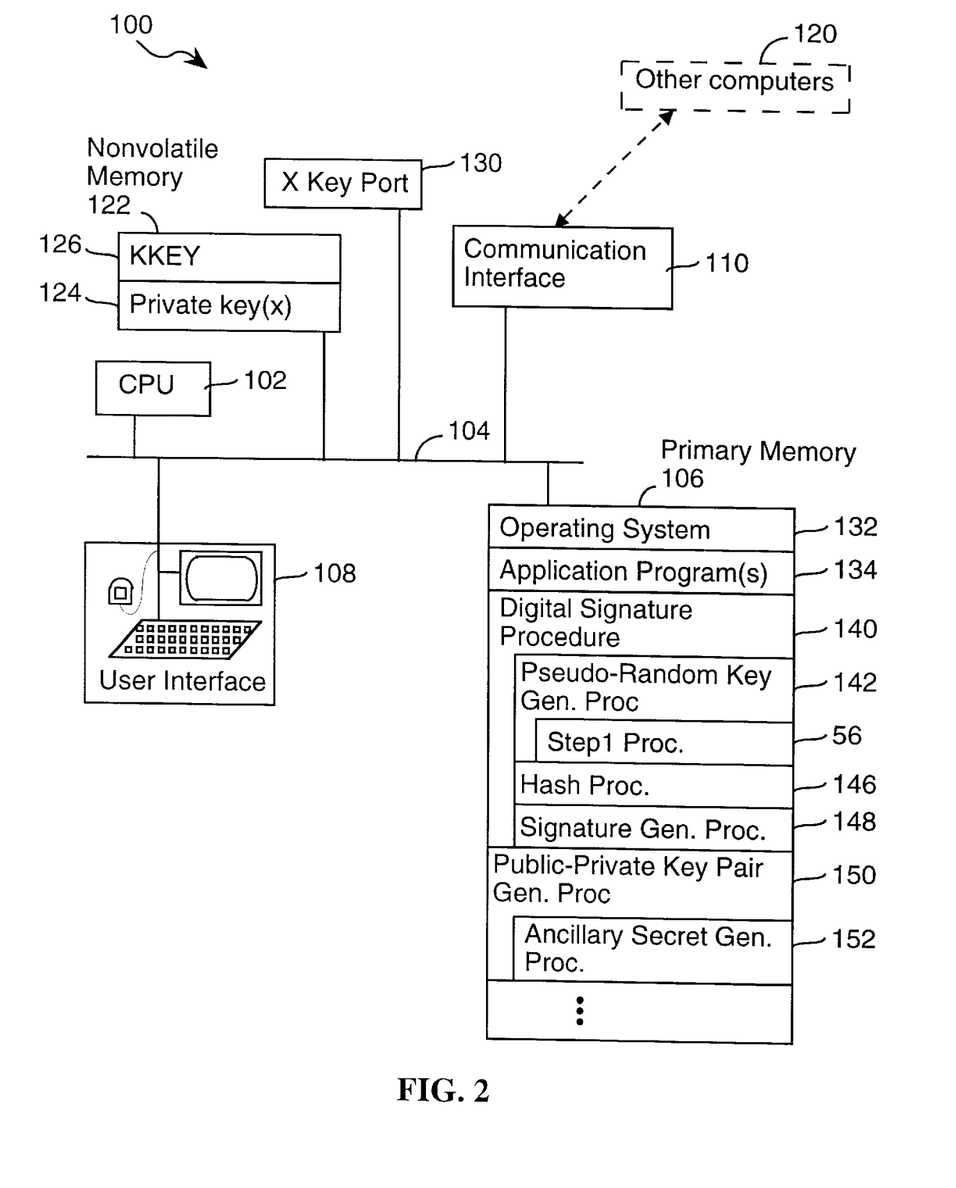
FIG. 2 is a block diagram of a computer system incorporating a preferred embodiment of the digital signature methodology of the present invention.

Referring to FIG. 2, there is shown a computer system 100 that incorporates the preferred embodiments of the digital signature methodology of the present invention. The computer system 100 includes a central processing unit (CPU) 102 (also called a processor) that is coupled by one or more internal busses 104 to a primary memory 106 and a user interface 108. A communication interface 110 couples the computer system 100 to other computers 120, such as for transmitting and receiving digitally signed documents. An optional, secure, non-volatile memory 122, such as a removable flash memory card, may be used to durably and securely store a user's private key 124, the State 1 procedure's internal KKEY state value 126, as well as other confidential information that may need to be durably and securely stored. The values stored in the non-volatile memory 122 may be encrypted, using a password or PIN value as the encryption key, so as to protect the memory's contents from unauthorized access. Similarly, if the user's private key and the KKEY state value are stored on disk (as part of memory 106), those values will typically be encrypted, using a password or PIN value as the encryption key, so as to protect those stored values from unauthorized access. A key port 130 or other similar device may be used to receive a user's private key value from an external, portable device.

The primary memory 106 preferably includes both high speed, random access memory (RAM) and non-volatile memory such as disk storage. The primary memory 106 stores:

an operating system 132, providing basic system capabilities, including file storage, message transmission and receipt services, and so on;

application programs 134, including programs such as financial or electronic commerce programs that may require the user to digitally sign documents;

a digital signature module 136 for digitally signing documents; and a public-private key pair generation procedure 150 for generating public-private key pairs.

A non-volatile portion of primary memory 106 may be used to store the user's private key x and the KKEY internal state value, with appropriate protections such as encryption of those values.

In some implementations the public-private key pair generation procedure 150 may include instructions, or a sub-procedure 152, for generating ancillary secret values AS that are as unguessable as the private keys generated by the public-private key pair generation procedure 150.

The digital signature module 136 has a number of procedures, including:

a pseudo-random key generation procedure 142, which may in some implementations include the Step 1 procedure 56 that is part of the Digital Signature Standard;

a one-way hash procedure 146, which preferably implements the Secure Hash Algorithm (SHA) for generating digest of any specified document; and a signature generation procedure 148 for combining a private key x, a pseudo-random key k and a document digest H so as to generate a digital signature for the document whose digest is the document digest H provided to the procedure.

In all the preferred embodiments, the hashing procedure 146 used is preferably the well-known SHA procedure. In alternate embodiments the hashing procedure 146 can be any one-way hashing function or procedure that (A) produces a hash of an input document of a suitable bit-length for use as an input to the signature generation procedure 148, and (B) that has the property than any change anywhere in the document being hashed, including a single bit change anywhere in the document, changes the hash value generated by the procedure. An alternate definition of the hash procedure 146 is that it must be infeasible to find two documents having the same hash value.

In all the preferred embodiments, the signature generation procedure 148 used is preferably the well-known DSA procedure. In alternate embodiments the signature generation procedure 148 could be any other document signing procedure that (A) uses as inputs the signer's private key, a pseudo-random key, and a hash of the document being signed; and (B) that is reliably secure (i.e., non-invertible or non-reversible) so long as the private key used is unguessable and the pseudo-random key is both unguessable and never re-used with the same private key to sign two different documents; and (C) provides non-repudiation of the signed document through use of a signer's public key that corresponds to the private key used to generate the digital signature.

First Preferred Embodiment of Digital Signature Procedure Simple Approach

Figure 3:
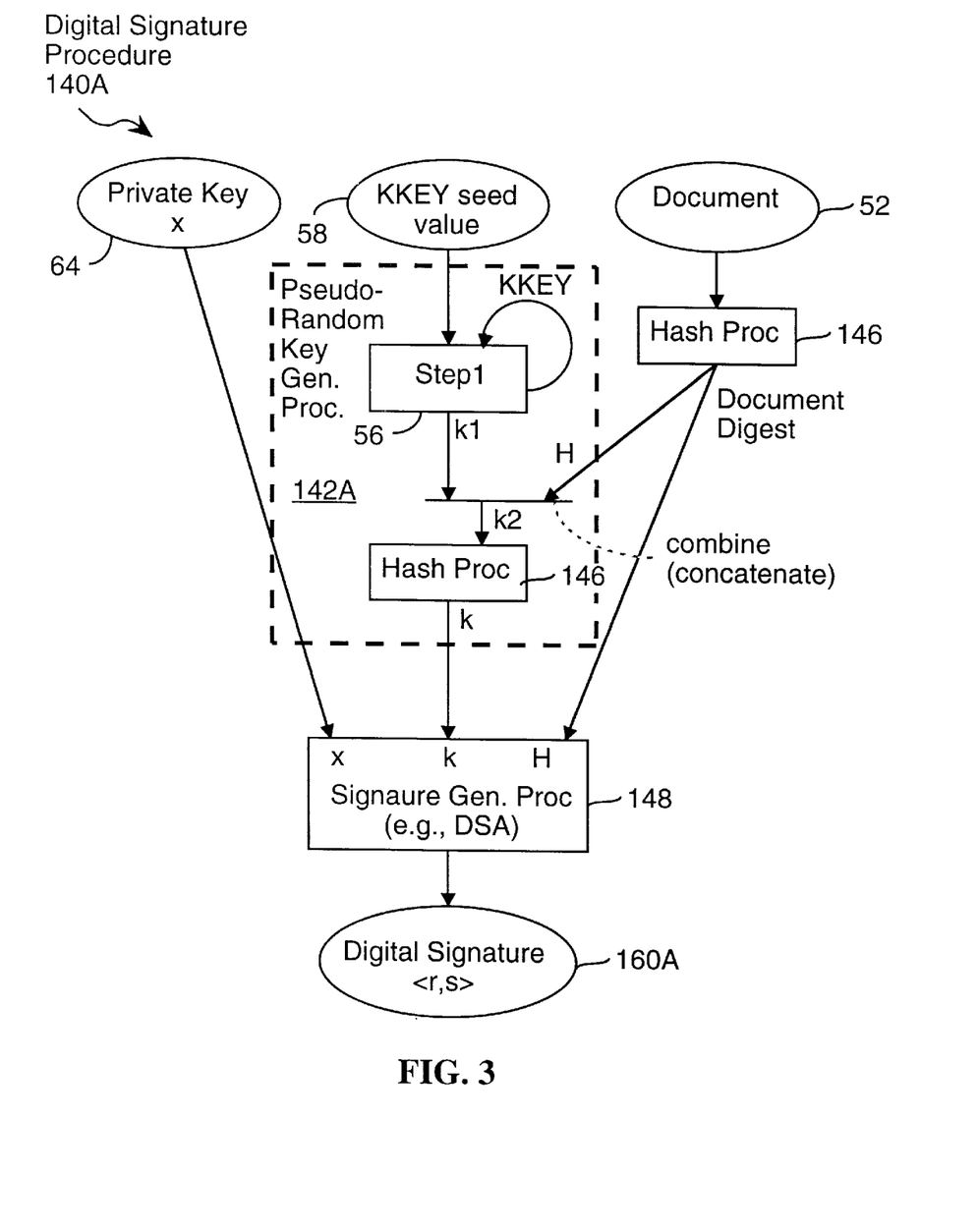
FIG. 3 is a data flow diagram of a first preferred embodiment of a digital signature procedure in accordance with the present invention.

FIG. 3 shows a data flow diagram of a first preferred embodiment of the digital procedure 140A of the present invention. This embodiment (as do all the preferred embodiments) directly eliminates the "duplication of k" risk by using a new pseudo-random key generation procedure 142A. This new procedure uses the digest H of the document 52 to be signed, as produced by hashing procedure 146, as an additional input to the creation of each pseudo-random key "k". More specifically the pseudo-random key k is generated by:

combining the document digest H with the output, herein called k1, of the Step 1 procedure 56, preferably by concatenating k1 and H, to produce an intermediate value k2; and hashing the k2 value with the hashing procedure 146 to generate the pseudo-random key k.

Since the document digest H is one of the inputs used to create the pseudo-random key k, and since the hashing procedure 146 generates a different output whenever its input changes by even one bit value, this method of generating the pseudo-random key k prevents the creation of the same pseudo-random key "k" for two different documents, even if the result ("k1") of the Step 1 process generates a duplicate value.

A digital signature 160A is generated by the signature generation procedure 148 using as its inputs (A) the pseudo-random key k generated by the new pseudo-random key generation procedure 142A, (B) the signer's private key x, and the hash H of the document being signed.

Figure 4:
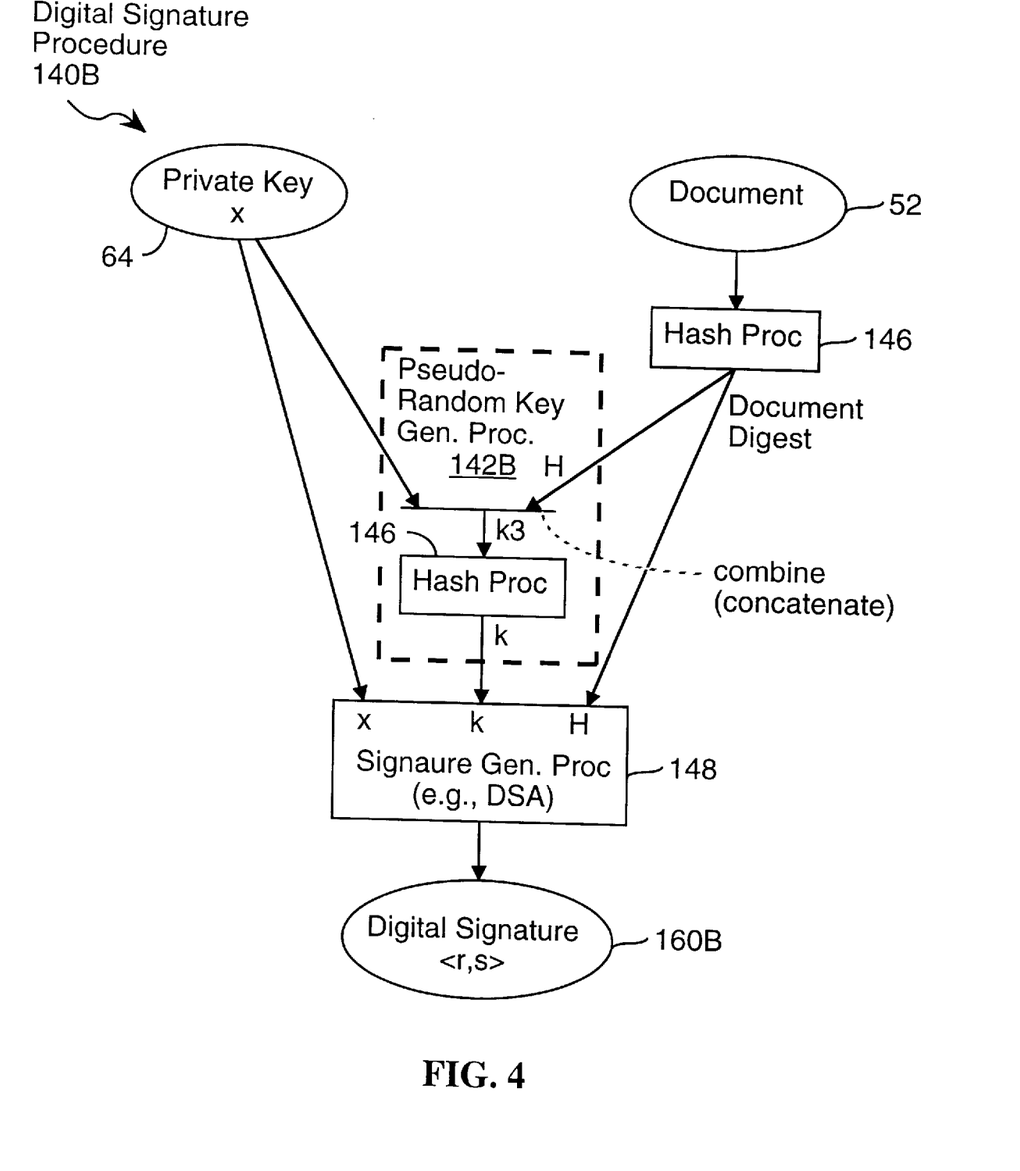
FIG. 4 is a data flow diagram of a second preferred embodiment of a digital signature procedure in accordance with the present invention.

Second Preferred Embodiment of Digital Signature Procedure Simple Combined Approach FIG. 4 shows a second preferred embodiment of the digital signature generation procedure 140B. This embodiment addresses both the duplication of "k" problem and the source of good unguessable "seed" values problem. In this embodiment the pseudo-random key generation procedure 142B:

combines the document digest H, generated by hash procedure 146, with the signer's private key x, preferably by concatenating the two values, to generate an intermediate value k3; and hashes the intermediate value k3 with the hash procedure 146 to generate a pseudo-random key k.

Since the document digest is used as one of the key generation procedure's inputs, the pseudo-random key k generated by this procedure 142B is different for every different document. This ensures that each document/signer pair always utilizes a unique pseudo-random key "k" value. In this particular embodiment, the Step 1 procedure is also eliminated, providing a computationally simpler and more efficient process.

Since the document digest H can be computed by anyone, an unguessable number seed is still also necessary as an additional input for generating the pseudo-random key k. This embodiment uses the signer's private key "x" as that additional input. The signer's private key "x" is used as it is already known to the digital signature generation procedure 140B and is already known to be a strong, unique, unguessable number. Further, there is no point in keeping "k" secret if "x" is known, nor in guarding "x" and not "k" in either this or the original DSS.

A digital signature 160B is generated by the signature generation procedure 148 using as its inputs (A) the pseudo-random key k generated by the new pseudo-random key generation procedure 142B, (B) the signer's private key x, and the hash H of the document being signed.

Importantly, initial analysis indicates that this second embodiment does not further expose the private key "x" to attack, even by the addition of a second "path" to "x". The original path (through the signature generation procedure 148) exists as before, and the new path is through both the signature generation procedure 148 and the hash procedure 146. Of course, the systems used today to generate strong private key "x" values could also be modified to create an additional value "x2" at the same time, and that additional value could then be used here instead of the "x" value itself. This would still provide a "single source" of creation of strong keys, both "x" and the input x2 to the procedure 142 for generating pseudo-random keys ("k's").

Since the goal is simply to create a unique pseudo-random key "k", hashing the concatenation of private key "x" and the document digest H with the hashing procedure 146 is sufficient to produce such a pseudo-random key. This also eliminates the Step 1 procedure and its dependency on the maintenance of internal state values.

There are, however, some drawbacks to the approach used in this second preferred embodiment. The potential additional exposure to "x," while believed to be virtually non-existent, should be further researched. The elimination of the Step 1 procedure also prevents this embodiment from meeting the current DSS standard. The addition of the hashing step to the process of creating a pseudo-random key "k" also precludes one stated benefit of DSS–that it could be used to "pre-compute" a sequence of unique pseudo-random keys "k", allowing some of the DSA computational steps to be performed prior to receiving requests to digitally sign specified documents. This second preferred embodiment of the digital signature procedure 140B therefore precludes the use of "compute ahead" schemes that might otherwise be used to reduce signature latency or to spread some of the computational work among (multiple) specialized processors.

Extensions to the Simple Combined Approach

Figure 5:
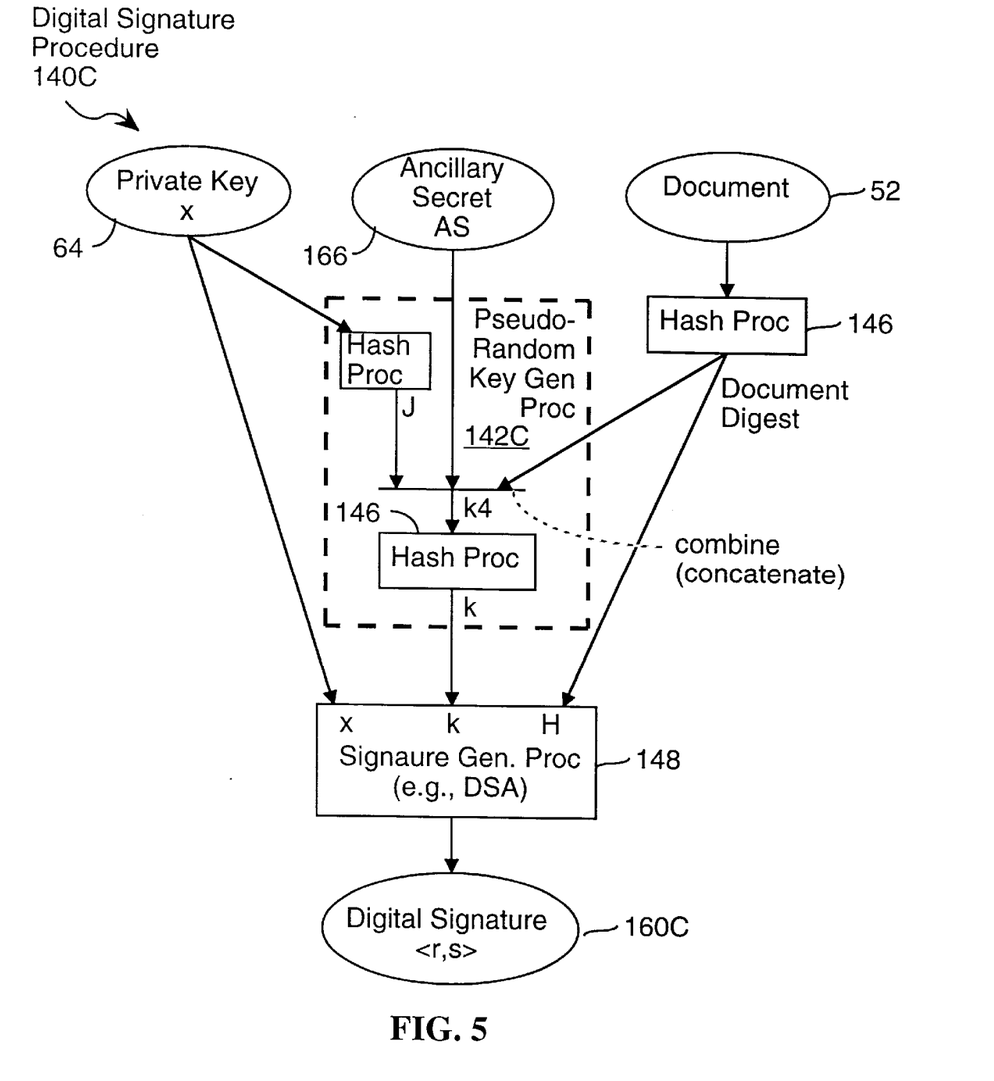
FIG. 5 is a data flow diagram of a third preferred embodiment of a digital signature procedure in accordance with the present invention.
Figure 6:
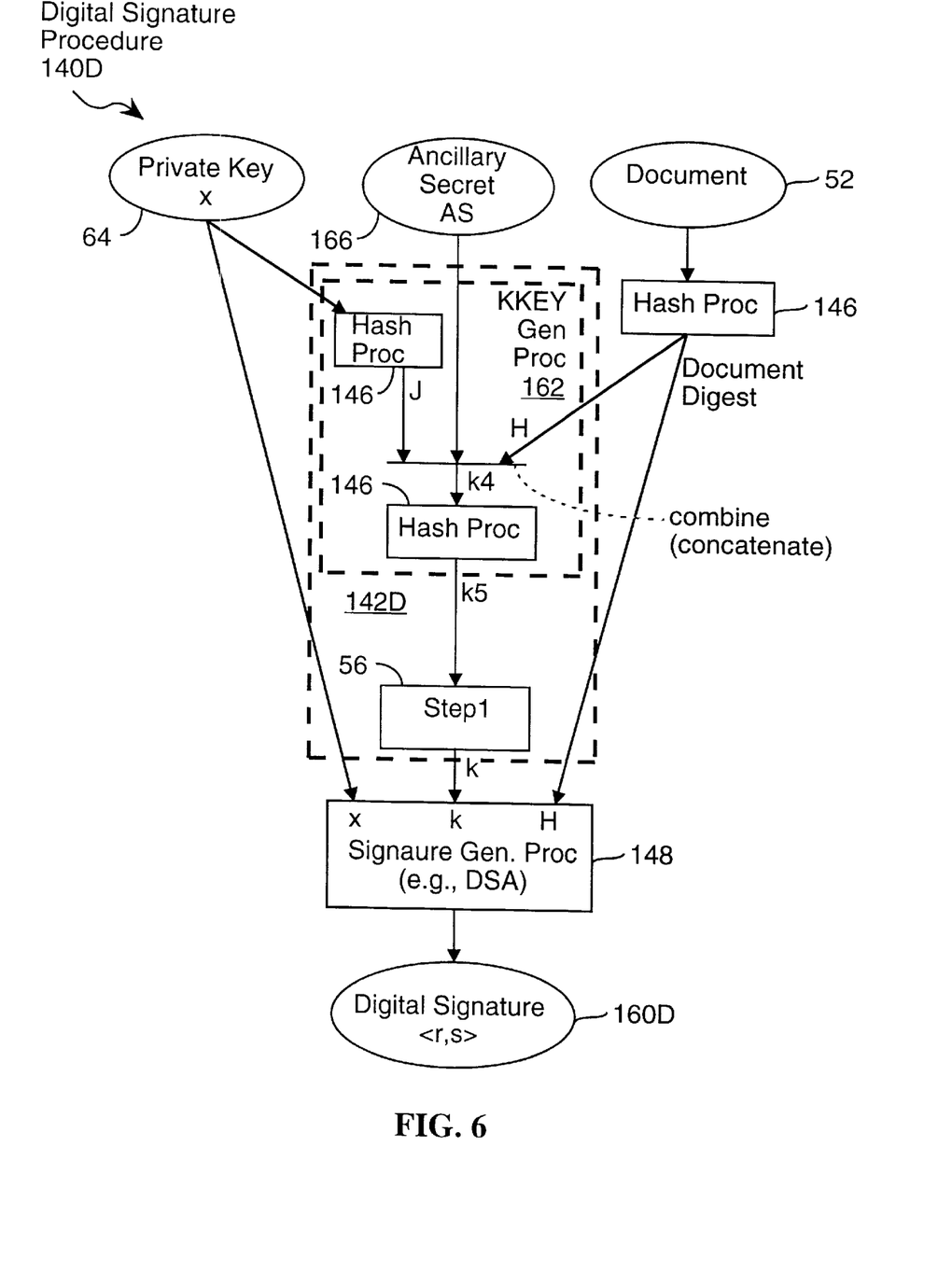
FIG. 6 is a data flow diagram of a fourth preferred embodiment of a digital signature procedure in accordance with the present invention.

Referring to FIGS. 5 and 6, there are two extensions to the Simple Combined Approach described above with respect to FIG. 4, which can further strengthen the digital signature procedure 140, if desired. The first extension is to use the hash J of the signer's private key "x", rather than the private key "x" itself in the process of generating the pseudo-random key "k". The second would be to add an additional "ancillary secret" ("AS") to the process of generating the pseudo-random key "k", along with the private key "x" (or the hash J of the private key x) and the document digest. Of course, the ancillary secret ("AS") could be designed as one of any size or source, including reverting to using things comparable to the original KKEY seed value.

Referring to FIG. 5, in the third preferred embodiment, the digital signature procedure 140C includes a pseudo-random key generation procedure 142C that:

hashes the signer's private key x to generate a hash value J;
combines the hashed private key value J, the ancillary secret value AS and the document digest H, preferably by concatenating them, to generate an intermediate value k4; and
hashes the intermediate value k4 with the hash procedure 146 to generate a pseudo-random key k.

A digital signature 160C is generated by the signature generation procedure 148 using as its inputs (A) the pseudo-random key k generated by the new pseudo-random key generation procedure 142C, (B) the signer's private key x, and the hash H of the document being signed.

This method of generating a pseudo-random key k, with or without an ancillary secret or KKEY-type source, addresses the original concerns about the potential impacts on any loss of state, since the same pseudo-random key "k" could never be produced for different documents. It also further reduces any exposure of the signer's private key that could be introduced by the simple approach. However, it still has some of the other same drawbacks of the simple approach.

Adding More DSS Compliance

Section 3.2 of the Digital Signature Standard describes the "Step 1" procedure, requiring it to use a secret, initial KKEY seed value for the internal KKEY state value, and computing a sequence of pseudo-random keys, "k". A small additional extension to the approach above returns the Step 1 function to the pseudo-random key generation process. The major difference between the fourth preferred embodiment shown in FIG. 6 and the original DSS implementations is in the generation of the KKEY seed value used as the Step 1's input.

Referring to FIG. 6, in the third preferred embodiment, the digital signature procedure 140D includes a pseudo-random key generation procedure 142D that:

hashes the signer's private key x to generate a hash value J;
combines the hashed private key value J, the ancillary secret value AS and the document digest H, preferably by concatenating them, to generate an intermediate value k4;
hashes the intermediate value k4 with the hash procedure 146 to generate a KKEY seed key value herein called k5; and
executes the Step 1 procedure to generate a pseudo-random key k as a function of the k5 seed key value.

Since a new k5 seed key value is generated for every signature, the internal KKEY state of the Step 1 procedure is always replaced, for each iteration of the procedure, with the new k5 seed key value.

A digital signature 160D is generated by the signature generation procedure 148 using as its inputs (A) the pseudo-random key k generated by the new pseudo-random key generation procedure 142D, (B) the signer's private key x, and the hash H of the document being signed.

While the danger of Step 1 having a loss of retained state remains, the methodology used by this fourth preferred embodiment ensures that, even if the Step 1 procedure reverts to a prior used state, the resulting output pseudo-random key "k" will still be unique for any two documents with the same signer. This embodiment therefore complies more directly with the current DSS standard, yet successfully addresses the concerns raised above relative to both the retained state issue and the strength of the KKEY seed key values. While there may be a slight performance penalty over existing implementations due to the extra computational steps used to generate a unique KKEY seed key value (k5 in FIG. 6) for every signer/document pair, it should be noted that the added computational burden is minimal because the additional computational steps consist of two executions of the hash procedure 146, which is typically very fast, and a concatenation procedure, which takes virtually no computational resources whatsoever.

The only other drawback of this embodiment is that it still does not provide for the pre-computation of pseudo-random keys "k" for later use by DSA in generating individual signatures once a document is presented. However, with current computational power available on most computer systems, this may be a very acceptable tradeoff in order to provide the higher assurance of not getting duplicate "k" values.

The ability of the Digital Signature Standard to protect users' private keys is weakened whenever the same value is reused for the pseudo-random key. The present invention provides a number of computationally simple steps that entirely eliminate the danger of signing different documents with the same pseudo-random key value "k". Further, the present invention provides computationally simple steps for ensuring that the pseudo-random key value "k" used to generate each digital signature is as unguessable as the signer's private key.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

The present invention can be used with virtually any digital signature methodology, and more particularly with all ElGamal digital signatures, see Horster, Michels and Petersen, "Generalized ElGamal signatures for one message block," University of Technology Chemnitz-Zwickau, Technical Report TR-94-3, May 30, 1994.

The present invention may be implemented either in computer hardware, in computer software, or a combination thereof. Computer software embodying the present invention can be stored or transported in any computer readable media, or may distributed electronically over computer and other communication networks.

What is claimed is:

1. A method of digitally signing a specified document, comprising the steps of:

receiving a private key associated with a person or entity signing the document;

generating a digest of the specified document using a predefined one-way hash function;

generating a pseudo-random key, k, including combining the document digest with at least one other value in accordance with a predefined computational procedure; and generating a digital signature for the specified document as a predefined function of the private key, the document digest, and the pseudo-random key k;

whereby a distinct pseudo-random key is generated for each distinct specified document; and for a given value of the private key, a distinct digital signature is generated for each distinct specified document.

2. The method of claim 1, wherein the predefined one-way hash function has the property that it generates distinct digest values for virtually all pairs of distinct documents.

3. A method of digitally signing a specified document, comprising the steps of:

receiving a private key associated with a person or entity signing the document;

generating a digest of the specified document using a predefined one-way hash function;

generating a pseudo-random key, k, including combining the document digest with a value corresponding to the private key to generate an intermediate value, and hashing the intermediate value with the predefined one-way hash function to generate the pseudo-random key k; and generating a digital signature for the specified document as a predefined function of the private key, the document digest, and the pseudo-random key k;

whereby a distinct pseudo-random key is generated for each distinct specified document; and for a given value of the private key, a distinct digital signature is generated for each distinct specified document.

4. A method of digitally signing a specified document, comprising the steps of:

receiving a private key associated with a person or entity signing the document;

generating a digest of the specified document using a predefined one-way hash function;

generating a pseudo-random key, k, including:

hashing the private key with the predefined one-way hash function to generate a first intermediate value;

combining the document digest with a value corresponding to the first intermediate value and an ancillary secret value to generate a second intermediate value, and hashing the second intermediate value with the predefined one-way hash function to generate the pseudo-random key k; and generating a digital signature for the specified document as a predefined function of the private key, the document digest, and the pseudo-random key k;

whereby a distinct pseudo-random key is generated for each distinct specified document; and for a given value of the private key, a distinct digital signature is generated for each distinct specified document.

5. A method of digitally signing a specified document, comprising the steps of:

receiving a private key associated with a person or entity signing the document;

generating a digest of the specified document using a predefined one-way hash function;

generating a pseudo-random key, k, including:

hashing the private key with the predefined one-way hash function to generate a first intermediate value;

combining the document digest with a value corresponding to the first intermediate value and an ancillary secret value to generate a second intermediate value;

hashing the second intermediate value with the predefined one-way hash function to generate a seed key value; and performing a predefined pseudo-random key generation procedure, using the generated seed key value as an input thereto, to generate the pseudo-random key k; and generating a digital signature for the specified document as a predefined function of the private key, the document digest, and the pseudo-random key k;

whereby a distinct pseudo-random key is generated for each distinct specified document; and for a given value of the private key, a distinct digital signature is generated for each distinct specified document.

6. A computer program product for use in conjunction with a computer system, the computer program product comprising a computer readable storage medium and a computer program mechanism embedded therein, the computer program mechanism comprising:

a one-way hash procedure for generating a digest of a specified document;

pseudo-random key generation instructions, including instructions for combining the document digest with at least one other value in accordance with a predefined computational methodology to generate a pseudo-random key k; and digital signature generation instructions for generating a digital signature for the specified document as a predefined function of a private key, the document digest, and the pseudo-random key k; wherein the private key is associated with a person or entity signing the specified document;

whereby a distinct pseudo-random key is generated for each distinct specified document; and for a given value of the private key, a distinct digital signature is generated for each distinct specified document.

7. The computer program product of claim 6, wherein the predefined one-way hash function has the property that it generates distinct digest values for virtually all pairs of distinct documents.

8. A computer program product for use in conjunction with a computer system, the computer program product comprising a computer readable storage medium and a computer program mechanism embedded therein, the computer program mechanism comprising:

a one-way hash procedure for generating a digest of a specified document;

pseudo-random key generation instructions, including instructions for combining the document digest with a value corresponding to the private key to generate an intermediate value, and hashing the intermediate value with the predefined one-way hash function to generate the pseudo-random key k; and digital signature generation instructions for generating a digital signature for the specified document as a predefined function of a private key, the document digest, and the pseudo-random key k; wherein the private key is associated with a person or entity signing the specified document;

whereby a distinct pseudo-random key is generated for each distinct specified document; and for a given value of the private key, a distinct digital signature is generated for each distinct specified document.

9. A computer program product for use in conjunction with a computer system, the computer program product comprising a computer readable storage medium and a computer program mechanism embedded therein, the computer program mechanism comprising:

a one-way hash procedure for generating a digest of a specified document;

pseudo-random key generating instructions, including instructions for:

hashing the private key with the predefined one-way hash function to generate a first intermediate value;

combining the document digest with a value corresponding to the first intermediate value and an ancillary secret value to generate a second intermediate value, and hashing the second intermediate value with the predefined one-way hash function to generate the pseudo-random key k; and digital signature generation instructions for generating a digital signature for the specified document as a predefined function of a private key, the document digest, and the pseudo-random key k; wherein the private key is associated with a person or entity signing the specified document;

whereby a distinct pseudo-random key is generated for each distinct specified document; and for a given value of the private key, a distinct digital signature is generated for each distinct specified document.

10. A computer program product for use in conjunction with a computer system, the computer program product comprising a computer readable storage medium and a computer program mechanism embedded therein, the computer program mechanism comprising:

a one-way hash procedure for generating a digest of a specified document;

pseudo-random key generating instructions, including instructions for:

hashing the private key with the predefined one-way hash function to generate a first intermediate value;

combining the document digest with a value corresponding to the first intermediate value and an ancillary secret value to generate a second intermediate value;

hashing the second intermediate value with the predefined one-way hash function to generate a seed key value; and performing a predefined pseudo-random key generation procedure, using the generated seed key value as an input thereto, to generate the pseudo-random key k; and digital signature generation instructions for generating a digital signature for the specified document as a predefined function of a private key, the document digest, and the pseudo-random key k; wherein the private key is associated with a person or entity signing the specified document;

whereby a distinct pseudo-random key is generated for each distinct specified document; and for a given value of the private key, a distinct digital signature is generated for each distinct specified document.

11. A system for digitally signing a specified document, comprising:

means for receiving a private key associated with a person or entity signing the document;

means for generating a digest of the specified document using a predefined one-way hash function;

means for generating a pseudo-random key, k, including combining the document digest with at least one other value in accordance with a predefined computational procedure; and means for generating a digital signature for the specified document as a predefined function of the private key, the document digest, and the pseudo-random key k;

whereby a distinct pseudo-random key is generated for each distinct specified document; and for a given value of the private key, a distinct digital signature is generated for each distinct specified document.

12. The system of claim 11, wherein the predefined one-way hash function has the property that it generates distinct digest values for virtually all pairs of distinct documents.

13. A system for digitally signing a specified document, comprising:

means for receiving a private key associated with a person or entity signing the document;

means for generating a digest of the specified document using a predefined one-way hash function;

means for generating a pseudo-random key, k, including means for combining the document digest with a value corresponding to the private key to generate an intermediate value, and hashing the intermediate value with the predefined one-way hash function to generate the pseudo-random key k; and means for generating a digital signature for the specified document as a predefined function of the private key, the document digest, and the pseudo-random key k;

whereby a distinct pseudo-random key is generated for each distinct specified document; and for a given value of the private key, a distinct digital signature is generated for each distinct specified document.

14. A system for digitally signing a specified document, comprising:

means for receiving a private key associated with a person or entity signing the document;

means for generating a digest of the specified document using a predefined one-way hash function;

means for generating a pseudo-random key, k, including means for hashing the private key with the predefined one-way hash function to generate a first intermediate value, and combining the document digest with a value corresponding to the first intermediate value and an ancillary secret value to generate a second intermediate value, and hashing the second intermediate value with the predefined one-way hash function to generate the pseudo-random key k; and means for generating a digital signature for the specified document as a predefined function of the private key, the document digest, and the pseudo-random key k;

whereby a distinct pseudo-random key is generated for each distinct specified document; and for a given value of the private key, a distinct digital signature is generated for each distinct specified document.

15. A system for digitally signing a specified document, comprising:

means for receiving a private key associated with a person or entity signing the document;

means for generating a digest of the specified document using a predefined one-way hash function;

means for generating a pseudo-random key, k, including combining the document digest with at least one other value in accordance with a predefined computational procedure; and means for generating a pseudo-random key, k, including means for:
  hashing the private key with the predefined one-way hash function to generate a first intermediate value;
  combining the document digest with a value corresponding to the first intermediate value and an ancillary secret value to generate a second intermediate value;
  hashing the second intermediate value with the predefined one-way hash function to generate a seed key value; and
  performing a predefined pseudo-random key generation procedure, using the generated seed key value as an input thereto, to generate the pseudo-random key k; and means for generating a digital signature for the specified document as a predefined function of the private key, the document digest, and the pseudo-random key k;

whereby a distinct pseudo-random key is generated for each distinct specified document; and for a given value of the private key, a distinct digital signature is generated for each distinct specified document.

* * * * *